United States Patent
Xiao et al.

(10) Patent No.: US 9,839,324 B2
(45) Date of Patent: Dec. 12, 2017

(54) HEAT PRESERVATION SYSTEM AND SMART CUP USING SAME

(71) Applicants: HONG FU JIN PRECISION INDUSTRY (WuHan) CO., LTD., Wuhan (CN); HON HAI PRECISION INDUSTRY CO., LTD., New Taipei (TW)

(72) Inventors: Xun-Yu Xiao, Wuhan (CN); Xi-Huai He, Wuhan (CN); Fang-Ta Tai, New Taipei (TW); Chun-Sheng Chen, New Taipei (TW)

(73) Assignees: HONG FU JIN PRECISION INDUSTRY (WuHan) CO., LTD., Wuhan (CN); HON HAI PRECISION INDUSTRY CO., LTD., New Taipei (TW)

( * ) Notice: Subject to any disclaimer, the term of this patent is extended or adjusted under 35 U.S.C. 154(b) by 225 days.

(21) Appl. No.: 14/750,598

(22) Filed: Jun. 25, 2015

(65) Prior Publication Data
US 2016/0345777 A1    Dec. 1, 2016

(30) Foreign Application Priority Data
May 29, 2015    (CN) .......................... 2015 1 0285345

(51) Int. Cl.
*A21B 1/52* (2006.01)
*A47J 41/00* (2006.01)
*H05B 3/00* (2006.01)

(52) U.S. Cl.
CPC .......... *A47J 41/005* (2013.01); *H05B 3/0014* (2013.01)

(58) Field of Classification Search
CPC .. A47J 41/005; A47J 36/2483; A47J 36/2461; A47J 36/2444; A47J 36/245; A47J 39/025; H05B 3/0014; A47G 19/2288; A47G 19/027
See application file for complete search history.

(56) References Cited

U.S. PATENT DOCUMENTS

| | | | |
|---|---|---|---|
| 8,618,448 B2 * | 12/2013 | Alexander | ......... A47G 19/2288 165/58 |
| 2015/0335184 A1 * | 11/2015 | Balachandran | .... A47G 19/2288 219/438 |

* cited by examiner

*Primary Examiner* — Shawntina Fuqua
(74) *Attorney, Agent, or Firm* — Steven Reiss

(57) ABSTRACT

A heating preservation system includes a selected unit, a control unit, a detection unit, and a heating unit. The selected unit is configured to select a preset temperature from amongst a plurality of differing preset temperatures, each preset temperature corresponds to a preset voltage. The control unit is configured to send out the preset voltage according to the selected preset temperature. The detection unit is configured to detect a temperature of fluid and convert the temperature to a detected voltage. The comparison unit is configured to receive the preset voltage and the detected voltage and compare the detected voltage with the preset voltage. The heating unit is configured to heat the fluid when the detected voltage is less than the preset voltage, and stop heating the fluid when the detected voltage is more than the preset voltage. A smart cup using the heating preservation system is further disclosed.

19 Claims, 4 Drawing Sheets

HEAT PRESERVATION SYSTEM AND SMART CUP USING SAME

FIELD

The subject matter herein generally relates to a heat preservation system and a smart cup with the heat preservation system.

BACKGROUND

A water dispenser is generally used to dispense hot water, warm water, and cool water, and a cup can be filled with hot water, or warm water, or cool water, or mixed water.

BRIEF DESCRIPTION OF THE DRAWINGS

Implementations of the present technology will now be described, by way of example only, with reference to the attached figures.

DETAILED DESCRIPTION

Figure 1:
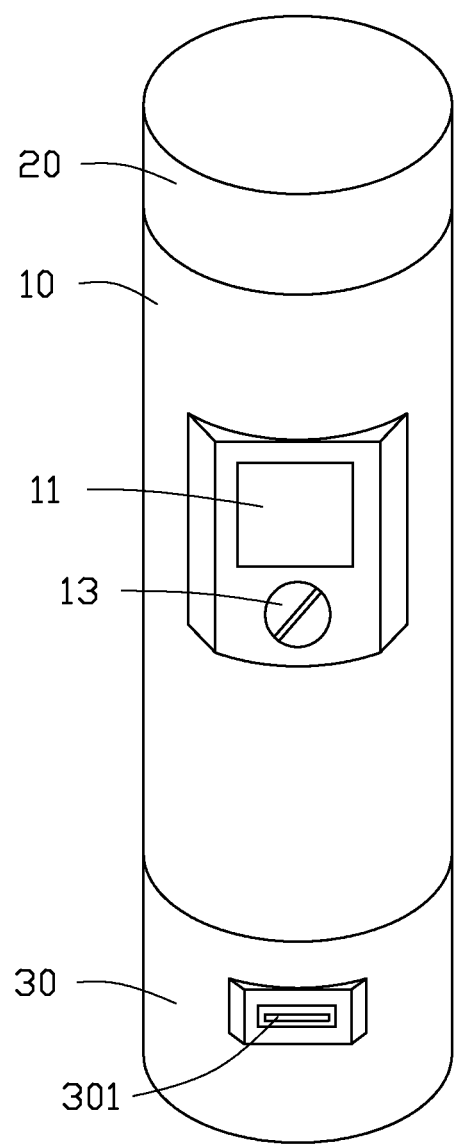
FIG. 1 is a diagrammatic view of an embodiment of a smart cup with a heat preservation system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series and the like.

FIG. 1 illustrates a smart cup in accordance with an embodiment, including a cup body 10, a cover 20, and a heat preservation system 30 secured to the cup body 10.

Figure 2:
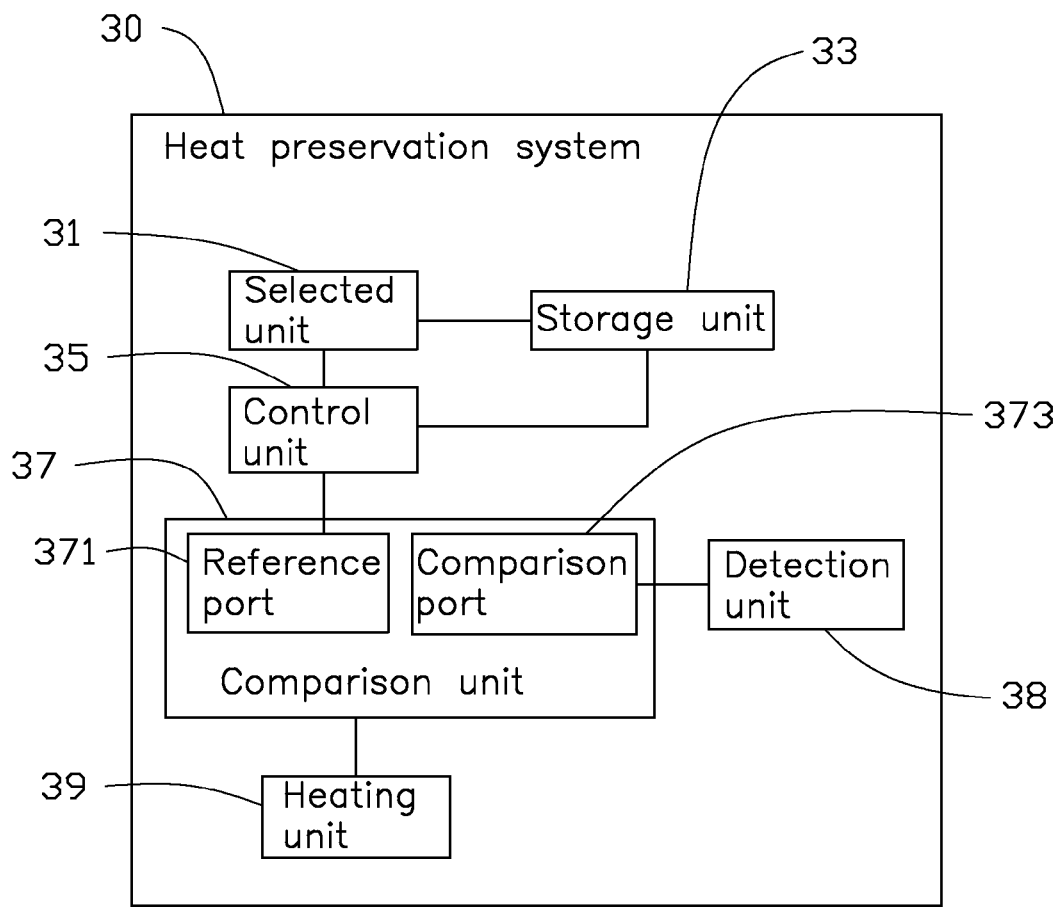
FIG. 2 is a block diagram of the heat preservation system of FIG. 1.

FIG. 2 illustrates the heat preservation system 30 can include a selected unit 31, a storage unit 33, a control unit 35, a comparison unit 37, a detection unit 38, and a heating unit 39.

Figure 3:
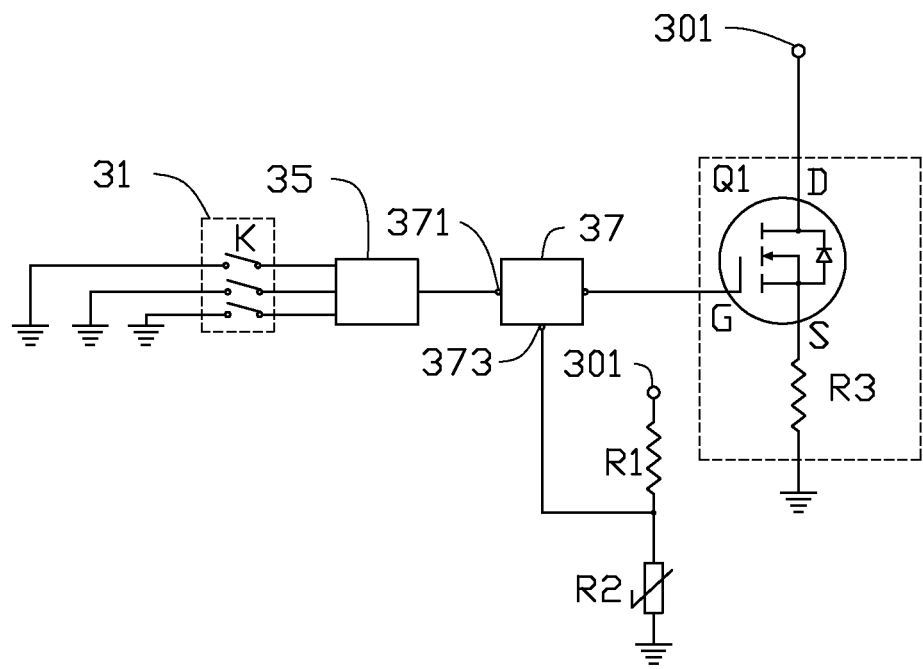
FIG. 3 is a circuit diagram of the heat preservation system of FIG. 2.

FIG. 2 and FIG. 3 illustrate that the selected unit 31 can include a plurality of selected switches K. Each selected switch K corresponds to a different preset water temperature. The plurality of selected switches K can be rotator, such as rotary knobs 13, or toggle switches.

The storage unit 33 is configured to store a relationship table of each selected switch K, a preset water temperature, and a preset voltage.

The control unit 35 is configured to find the preset voltage in the relationship table according to the selected switch K and send the preset voltage to the comparison unit 37.

Figure 4:
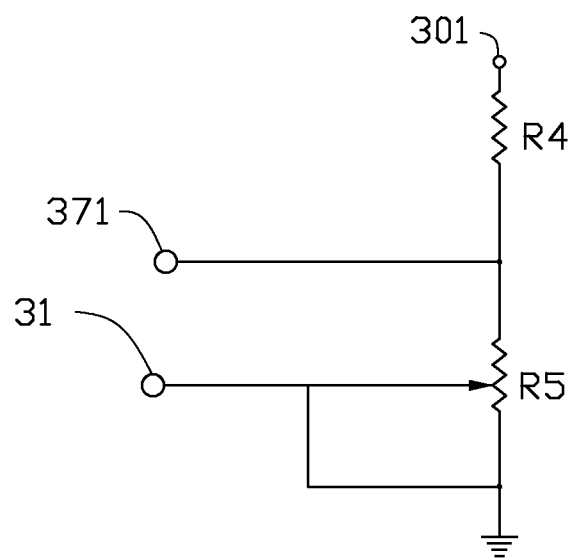
FIG. 4 is a circuit diagram of a control unit and a selected unit of the heat preservation system of FIG. 2.

FIG. 4 illustrates that the control unit 35 in other embodiments can include a slide rheostat R5 and a divider resistor R4 coupled to the slide rheostat R5 in parallel. The selected unit 31 is a sliding end of the slide rheostat R5, which can slidably adjust a resistance coupled to the divider resistor R4. When the resistance is changed, a divider voltage between the slide rheostat R5 and the divider resistor R4 is changed, and the divider voltage is sent to the comparison unit 37 to be taken as the preset voltage.

The comparison unit 37 can include a reference port 371 and a comparison port 373. The reference port 371 is configured to receive the preset voltage sent by the control unit 35. The comparison port 373 is configured to receive a detected voltage from the detection unit 38.

The detection unit 38 is configured to detect water temperature via the cup body 10 and convert the detected water temperature to the detected voltage to the comparison port 373. The detect water temperature can be displayed in a screen 11 on the cup body 10.

The detection unit 38 can include a pull-up resistor R1 and a thermistor R2. A first end of the pull-up resistor R1 is coupled to a high level voltage, such as +5V. The high level voltage can be supplied by a USB port 301 on the cup body 10. A second end of the pull-up resistor R1 is coupled to a first end of the thermistor R2. A second end of the thermistor R2 is grounded. The thermistor R2 abuts against an outer surface or a bottom surface of the cup body 10 and is capable of changing resistance according to the detected water temperature. Thus, a voltage of the first end and the second of the thermistor R2 can be changed, and the voltage is the detected voltage, which can be sent to the comparison port 373.

The comparison unit 37 is configured to compare the detected voltage to the preset voltage and send a comparison result to the heating unit 39.

The heating unit 39 can include a heating switch Q1 and a heating resistor R3. When the detected voltage is less than the preset voltage, the heating switch Q1 is switched on, the heating resistor R3 is operated to heat the liquid in the cup body 10. When the detected voltage is more than the preset voltage, the heating switch Q1 is switched off, the heating resistor R3 is stopped from heating the liquid in the cup body 10. In one embodiment, the heating switch Q1 is an n-typed field-effect tube. The gate electrode G of the heating switch Q1 is coupled to the comparison unit 37 and configured to receive the comparison result. The source electrode S of the heating switch Q1 is coupled to a first end of the heating resistor R3. A second end of the heating resistor R3 is grounded. The drain electrode D of the heating switch Q1 is coupled to the high level voltage. When the detected voltage is less than the preset voltage, the comparison unit 37 outputs a high level voltage signal, which switches on the heating switch Q1, so that the heating resistor R3 is coupled to the high level voltage and operated to heat the liquid in the cup body 10. When detected voltage is more than the preset voltage, the comparison unit 37 outputs a low level voltage signal, which switches off the heating switch Q1, so that the heating resistor R3 is disconnected from the high level voltage and stops heating the liquid in the cup body 10.

The embodiments shown and described above are only examples. Many details are often found in the art such as the other features of a heating preservation system and a smart cup using same. Therefore, many such details are neither shown nor described. Even though numerous characteristics and advantages of the present technology have been set forth in the foregoing description, together with details of the structure and function of the present disclosure, the disclosure is illustrative only, and changes may be made in the details, including in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A heating preservation system comprising:
a selected unit configured to select a preset temperature from amongst a plurality of differing preset temperatures, each preset temperature corresponding to a preset voltage;
a control unit configured to send the preset voltage according to the selected preset temperature;
a detection unit configured to detect a temperature of a fluid and convert the temperature to a detected voltage;
a comparison unit configured to receive the preset voltage and the detected voltage and compare the detected voltage with the preset voltage; and
a heating unit configured to heat the fluid when the detected voltage is less than the preset voltage, and stop heating the fluid when the detected voltage is more than the preset voltage;
wherein the detection unit comprises a pull-up resistor and a thermistor, a first end of the pull-up resistor is coupled to a high level voltage, a second end of the pull-up resistor is coupled to a first end of the thermistor, a second end of the thermistor is grounded.

2. The heating preservation system of claim 1, wherein the selected unit comprises a plurality of selected switches, each selected switch corresponds to a preset temperature and a preset voltage, and when the preset temperature is selected, the corresponded selected switch is switched on.

3. The heating preservation system of claim 2, further comprising a storage unit, wherein the storage unit is configured to store a relationship table of each selected switch, each preset temperature, and each preset voltage, and the control unit is configured to find the preset voltage in the relationship table according to the selected switch and send the preset voltage to the comparison unit.

4. The heating preservation system of claim 1, wherein the thermistor abuts against an outer surface or a bottom surface of the cup body.

5. The heating preservation system of claim 4, wherein the high level voltage is supplied by a USB port located on the cup body.

6. The heating preservation system of claim 4, wherein the heating unit comprises a heating switch and a heating resistor, when the detected voltage is less than the preset voltage, the heating switch is switched on, and the heating resistor is operated to heat the liquid in the cup body; when the detected voltage is more than the preset voltage, the heating switch is switched off, the heating resistor is stopped heating the liquid in the cup body.

7. The heating preservation system of claim 6, wherein the heating switch is a field-effect tube, the gate electrode of the heating switch is coupled to an output port of the comparison unit, the source electrode of the heating switch is coupled to a first end of the heating resistor, a second end of the heating resistor is grounded, and the drain electrode of the heating switch is coupled to the high level voltage.

8. The heating preservation system of claim 1, wherein the control unit comprises a slide rheostat and a divider resistor coupled to the slide rheostat in parallel, the selected unit is a sliding end of the slide rheostat, which can slidably adjust a resistance coupled to the divider resistor in parallel.

9. A heating preservation system comprising:
a selected unit configured to select a preset temperature from amongst a plurality of differing preset temperatures, each preset temperature corresponding to a preset voltage;
a storage unit configured to store a relationship table of each preset temperature and each preset voltage;
a control unit configured to find the preset voltage in the relationship table according to the selected preset temperature and send out the preset voltage;
a detection unit configured to detect a temperature of a fluid and convert the temperature to a detected voltage;
a comparison unit configured to receive the preset voltage and the detected voltage and compare the detected voltage with the preset voltage; and
a heating unit configured to heat the fluid when the detected voltage is less than the preset voltage, and stop heating the fluid when the detected voltage is more than the preset voltage.

10. The heating preservation system of claim 9, wherein the selected unit comprises a plurality of selected switches, each selected switch corresponds to a preset temperature and a preset voltage, and when the preset temperature is selected, the corresponded selected switch is switched on.

11. The heating preservation system of claim 10, wherein the relationship table further stores each selected switch, each preset temperature, and each preset voltage, and the control unit is configured to find the preset voltage in the relationship table according to the selected switch and send the preset voltage to the comparison unit.

12. The heating preservation system of claim 9, wherein the detection unit comprises a pull-up resistor and a thermistor, a first end of the pull-up resistor is coupled to a high level voltage, a second end of the pull-up resistor is coupled to a first end of the thermistor, a second end of the thermistor is grounded, and the thermistor abuts against an outer surface or a bottom surface of the cup body.

13. The heating preservation system of claim 12, wherein the high level voltage is supplied by a USB port located on the cup body.

14. The heating preservation system of claim 12, wherein the heating unit comprises a heating switch and a heating resistor, when the detected voltage is less than the preset voltage, the heating switch is switched on, and the heating resistor is operated to heat the liquid in the cup body; when the detected voltage is more than the preset voltage, the heating switch is switched off, the heating resistor is stopped heating the liquid in the cup body.

15. The heating preservation system of claim 14, wherein the heating switch is a field-effect tube, the gate electrode of the heating switch is coupled to an output port of the comparison unit, the source electrode of the heating switch is coupled to a first end of the heating resistor, a second end of the heating resistor is grounded, and the drain electrode of the heating switch is coupled to the high level voltage.

16. The heating preservation system of claim 9, wherein the control unit comprises a slide rheostat and a divider resistor coupled to the slide rheostat in parallel, the selected unit is a sliding end of the slide rheostat, which can slidably adjust a resistance coupled to the divider resistor in parallel.

17. A smart cup comprising:
a cup body configured to fill with liquid; and
a heating preservation system comprising:
- a selected unit configured to select a preset temperature from amongst a plurality of differing preset temperatures, each preset temperature corresponding to a preset voltage;
- a control unit configured to send out the preset voltage according to the selected preset temperature;
- a detection unit configured to detect a temperature of a fluid in the cup body and convert the temperature to a detected voltage;
- a comparison unit configured to receive the preset voltage and the detected voltage and compare the detected voltage with the preset voltage; and
- a heating unit configured to heat the fluid in the cup body when the detected voltage is less than the preset voltage, and stop heating the fluid when the detected voltage is more than the preset voltage;
- wherein the control unit comprises a slide rheostat and a divider resistor coupled to the slide rheostat in parallel, the selected unit is a sliding end of the slide rheostat, which can slidably adjust a resistance coupled to the divider resistor in parallel.

18. The smart cup of claim 17, wherein the detection unit comprises a pull-up resistor and a thermistor, a first end of the pull-up resistor is coupled to a high level voltage, a second end of the pull-up resistor is coupled to a first end of the thermistor, a second end of the thermistor is grounded, and the thermistor abuts against an outer surface or a bottom surface of the cup body.

19. The smart cup of claim 17, wherein the heating unit comprises a heating switch and a heating resistor, the heating switch is a field-effect tube, the gate electrode of the heating switch is coupled to an output port of the comparison unit, the source electrode of the heating switch is coupled to a first end of the heating resistor, a second end of the heating resistor is grounded, and the drain electrode of the heating switch is coupled to the high level voltage.

* * * * *